UNITED STATES PATENT OFFICE.

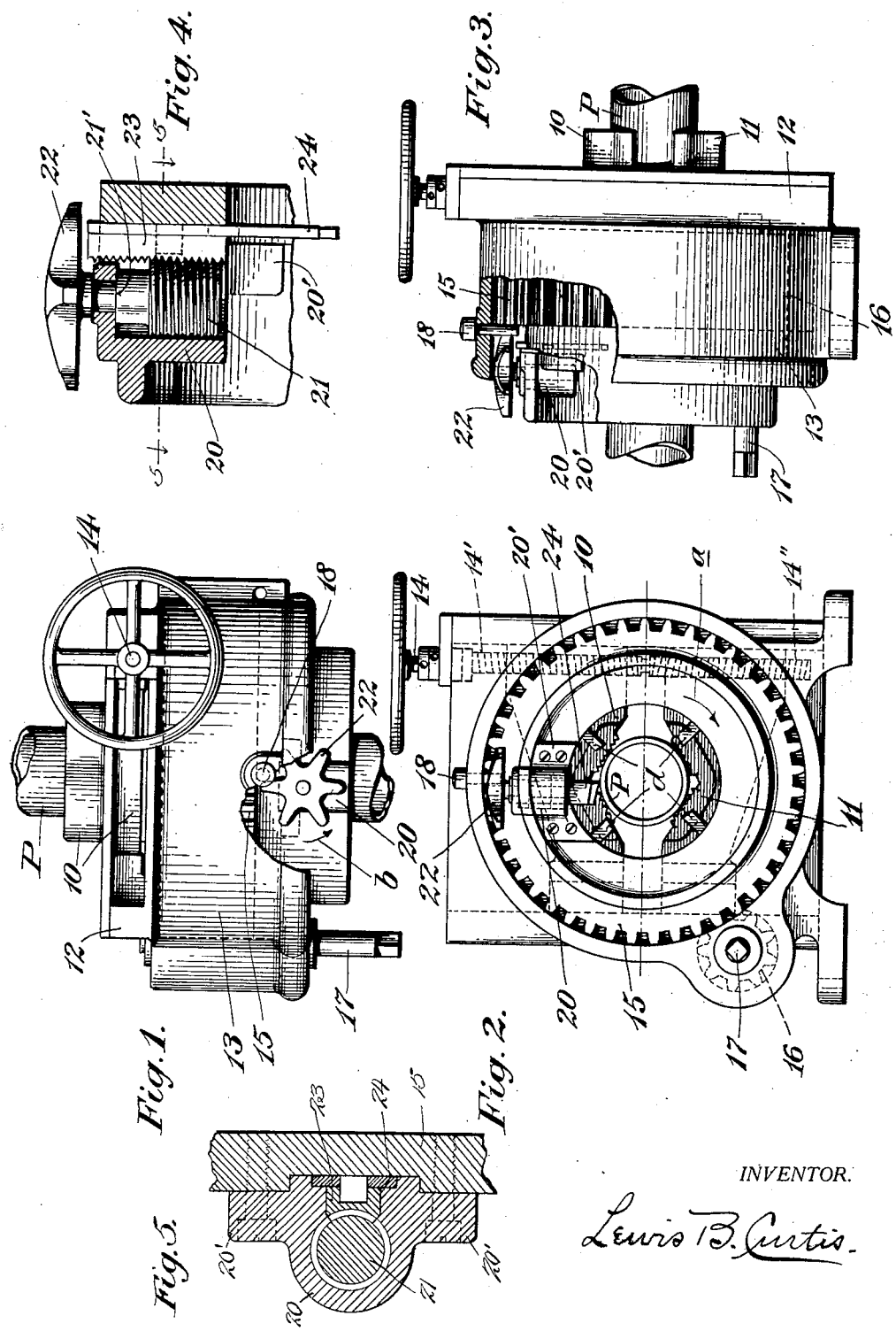

LEWIS B. CURTIS, OF BRIDGEPORT, CONNECTICUT.

CUTTING-OFF MACHINE.

1,386,163. Specification of Letters Patent. Patented Aug. 2, 1921.

Application filed October 22, 1919. Serial No. 332,425.

*To all whom it may concern:*

Be it known that I, LEWIS B. CURTIS, a citizen of the United States, residing at Bridgeport, in the county of Fairfield and State of Connecticut, have invented new and useful Improvements in Cutting-Off Machines, of which the following is a specification.

This invention relates to cutting-off machines, and more especially to that class thereof in which the cutting-off tool is revolved, bodily, around the object or work to be cut, and it has for its object the provision of an improved mechanism in which the tool-carrying member or driver is held against sliding movement longitudinally of the work by a device whereby, furthermore, the tool, itself, is gradually fed inward or toward the axial center of the work, in a step-by-step manner during the successive revolutions of the tool-carrying member.

The invention has, furthermore, for its object the improved organization and also construction of some of the component members of the mechanism, as will hereinafter appear and be particularly pointed out in the claims.

While my improved mechanism is susceptible of adaptation in many different forms of cutting-off machines, I have illustrated, in the accompanying drawings, a pipe-threading machine of a well known type, the die-carrying member of which is rotatably mounted in the shell of the machine and also carries the cutting-off tool above mentioned, it being understood that the pipe or other object to be cut is held stationary in the jaws provided for that purpose.

Referring to the drawings, in which similar characters denote similar parts, Figure 1 is a top-view of a pipe machine comprising my improved cutting-off device as one of its elements. Fig. 2 is a front view thereof, Fig. 3 represents a side view of the machine, the casing or shell being broken away to disclose the cut-off attachment, and Fig. 4 is a central vertical section of the cut-off device, *per se.* Fig. 5 represents a section on line 5, 5 of Fig. 4.

As above stated, in the machine illustrated, the pipe is held stationary while the cut-off tool revolves around it, a pair of vise-jaws 10, 11 being mounted for vertical movement in ways provided in a housing 12 which constitutes a portion of the main shell 13. A screw 14 having right and left-hand threads 14' is in engagement with the jaws 10, 11, respectively, and serves to close the latter on the pipe P which is to be cut off.

Mounted for rotation in the shell 13, is a die-carrier or gear 15 which carries at its front face the cut-off tool above mentioned, and which is operated by a pinion 16, the shaft 17 of which projects forward and has a squared end adapted to receive a handle or crank for its manipulation. The rotation of the main gear 15 is in the direction of the arrow *a*, so that, consequently, the dies *d* will cut a right hand thread on the pipe P. However, before this operation is performed, the pipe should first be trimmed or "squared-off," in order that the dies may be enabled to begin their work properly.

Now, inasmuch as the pipe is held stationary, and has no movement either rotatively or longitudinally, during the threading or cutting-off operation, the die-carrier or gear 15 must necessarily be mounted for longitudinal movement, as well as for rotation, within the shell, the latter being, for that reason, deeper than the width or face of the gear. Likewise it will be understood that, during the cutting-off operation, the gear 15 (which carries the cut-off tool) should be held against longitudinal movement in the shell, and therefore I provide a stop pin 18 which may be inserted through a perforation in the wall of the shell so as to engage and rest against the front face of the gear after the latter has reached its rearmost position in the shell, as shown in Fig. 3.

When the gear is thus held, the dies being in non-cutting positions, the pipe may then be cut off by the cut-off tool which comprises, in the preferred construction shown, a casing 20 having wings 20' whereby it is held on the gear 15 in any suitable manner.

Referring to Fig. 4 it will be noted that the casing 20 is bored to receive a worm or feed-screw 21 having a shoulder 21' at the inside of said casing, while a star wheel 22 is pinned to the stem of the screw, exteriorly of the casing, so that the screw is thus held against longitudinal sliding movement. Corresponding teeth are cut on a slidable rack-projection 23 preferably pinned as shown in Fig. 5, to the cut-off blade 24 which latter is thus operated radially to the rotation-axis of the gear 15, the organization being such that, for each rotation of said gear, the star wheel 22 is rotated by the same pin 18 for sixty degrees, as determined by the six arms of the star, such rotation being in the direction of arrow $b$ which causes the cut-off tool to be moved inwardly (or toward the pipe P) for a distance equal to one-sixth of the pitch of the screw.

The above, therefore, is conclusive of this essential fact, viz: that, in order to operate the cut-off tool automatically during the rotation of the main gear, 1st, the latter must be in its extremely-inner position in the shell, and 2nd, the pin 18 must be in the position shown in Fig. 2, to perform the two functions of locking the gear against longitudinal movement in the shell, and of operating the star-wheel of the cut-off device. Withdrawal of the pin 18 will leave the cut-off device inactive and simultaneously liberate the gear 15.

Changes may be advantageously made in the general organization, as well as in the particular construction of some of the elements of my improved device, without departing from the spirit of the invention, especially in the manner of feeding-in the cut-off tool, and the casing supporting the mechanism for accomplishing the same.

I claim—

1. A machine of the character described, comprising a vise, a tool-carrier, means for supporting said carrier for rotation and longitudinal movement relative to said vise, a cut-off tool mounted on said carrier, means for feeding-in said tool, and a device for locking said tool-carrier against longitudinal movement and for intermittently operating said feeding-in means during the successive rotations of said carrier.

2. A machine of the character described, comprising a vise for holding the work, a tool-carrier, a shell supporting said carrier for rotation and longitudinal movement relative to said vise, a cut-off tool mounted on said carrier, a screw for feeding-in said tool, and a device carried by said shell for locking said tool-carrier against longitudinal movement and for partially rotating said screw during each rotation of said carrier.

LEWIS B. CURTIS.

Witnesses:
E. I. STANTON,
V. W. NICHOLSON.